(12) United States Patent
Kawada

(10) Patent No.: US 7,292,821 B2
(45) Date of Patent: Nov. 6, 2007

(54) COMMUNICATION LINE CONNECTING APPARATUS AND METHOD OF CONTROLLING COMMUNICATION LINE CONNECTING APPARATUS

(75) Inventor: Hiroshi Kawada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 342 days.

(21) Appl. No.: 10/948,190

(22) Filed: Sep. 24, 2004

(65) Prior Publication Data

US 2005/0198355 A1    Sep. 8, 2005

(30) Foreign Application Priority Data

Sep. 29, 2003   (JP)   ............................. 2003-338592

(51) Int. Cl.
*H04H 1/00* (2006.01)

(52) U.S. Cl. .................... 455/3.01; 455/41.2; 370/338; 725/109

(58) Field of Classification Search .............. 455/3.01, 455/41.2, 41.3; 725/109–112; 370/338; 375/222
See application file for complete search history.

(56) References Cited

U.S. PATENT DOCUMENTS

2002/0163928 A1* 11/2002 Rudnick et al. ............ 370/444
2004/0255332 A1* 12/2004 Bertonis et al. ............ 725/123

FOREIGN PATENT DOCUMENTS

JP          08-228173        9/1996
JP          2002-152709      5/2002

* cited by examiner

*Primary Examiner*—Lee Nguyen
(74) *Attorney, Agent, or Firm*—Finnegan, Henderson, Farabow, Garrett & Dunner, L.L.P.

(57) ABSTRACT

An apparatus includes an acquiring circuit to acquire a definition file which specifies a band for use in the internal communication network for the terminal device, and a controller which allocates the band to the requesting terminal device based on the definition file, when a connection request occurs in the terminal device.

10 Claims, 5 Drawing Sheets

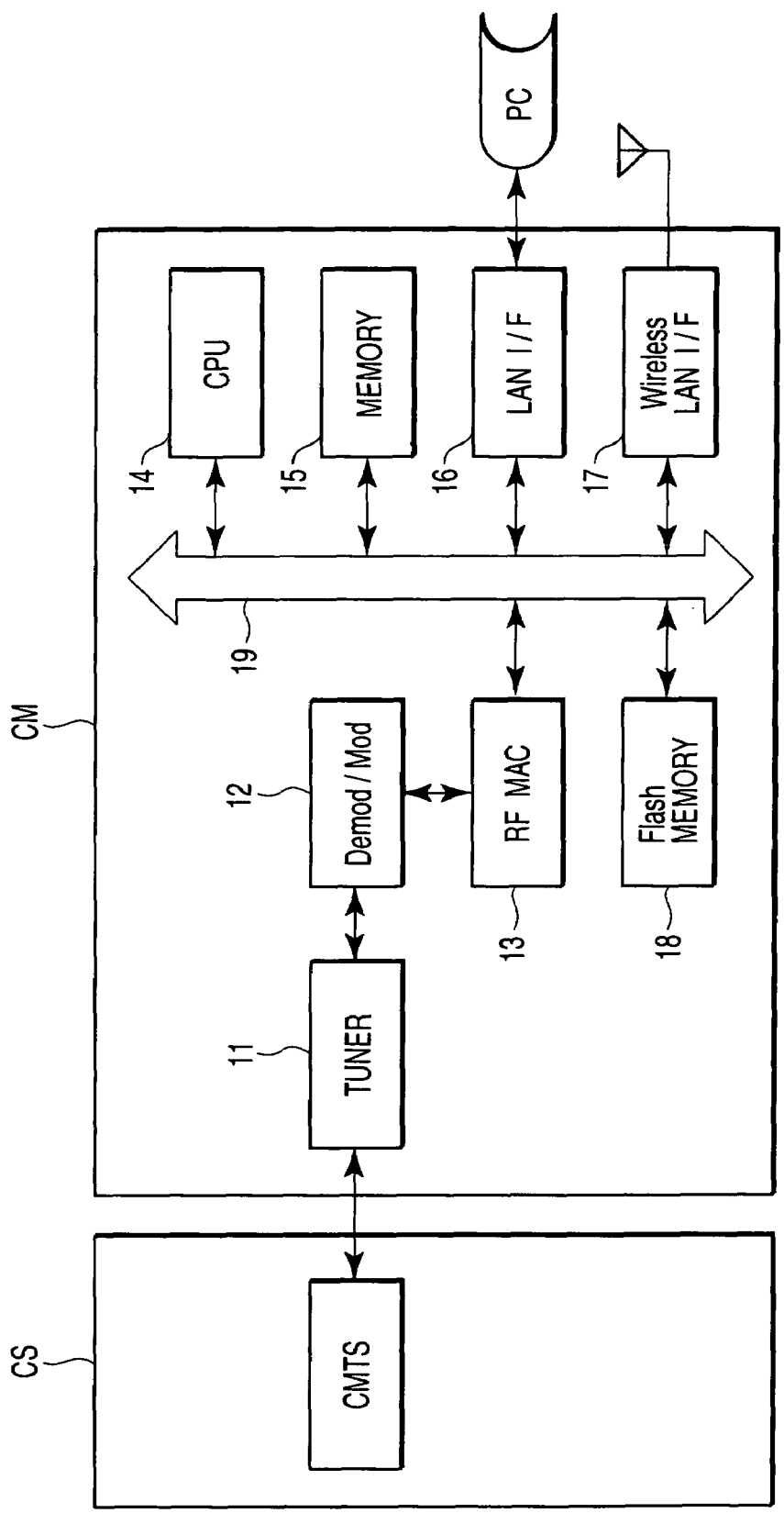
F I G. 2

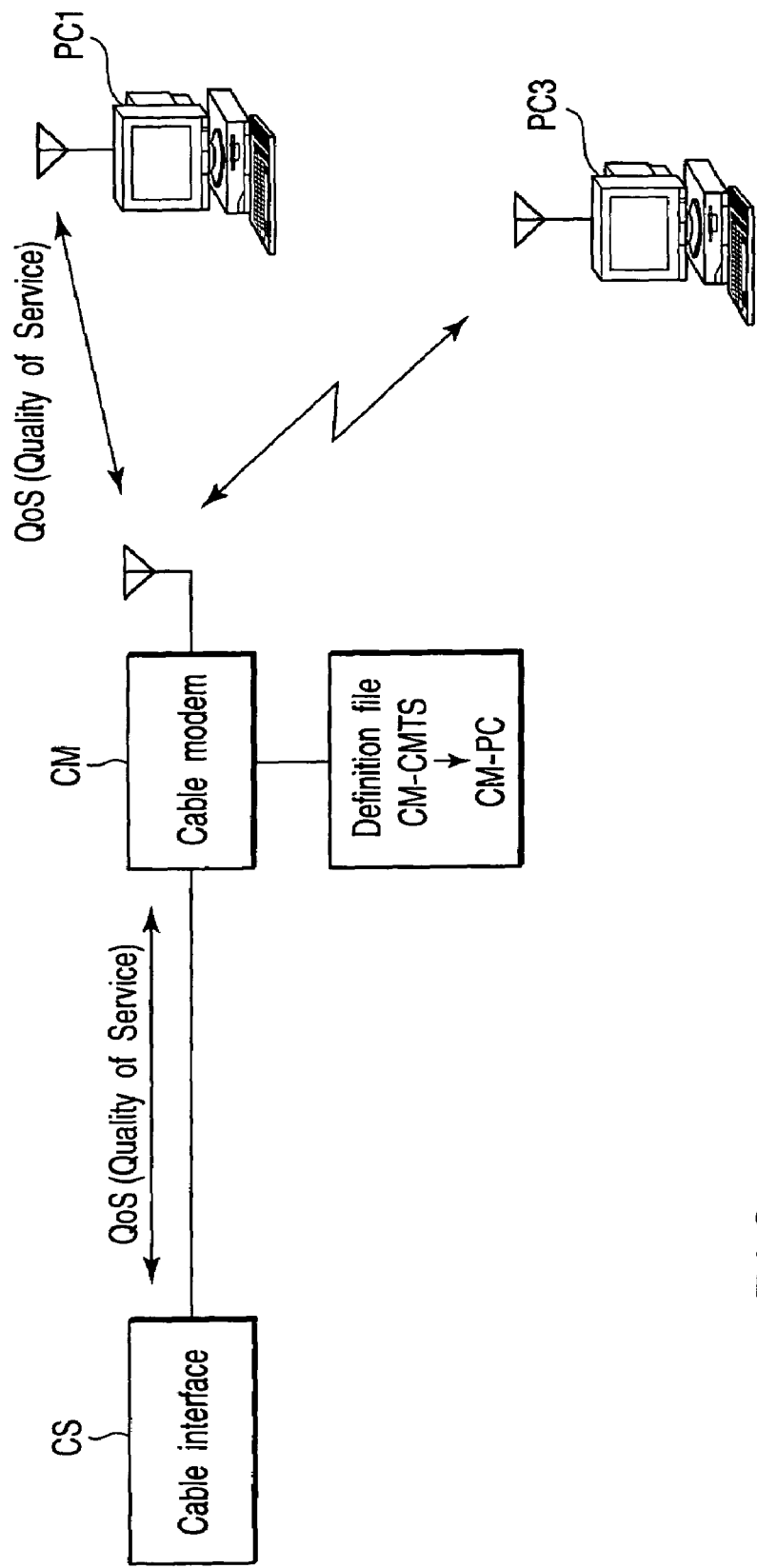
F I G. 4

COMMUNICATION LINE CONNECTING APPARATUS AND METHOD OF CONTROLLING COMMUNICATION LINE CONNECTING APPARATUS

CROSS-REFERENCE TO RELATED APPLICATIONS

This application is based upon and claims the benefit of priority from prior Japanese Patent Application No. 2003-338592, filed Sep. 29, 2003, the entire contents of which are incorporated herein by reference.

BACKGROUND OF THE INVENTION

1. Field of the Invention

The present invention relates to a cable modem for use in, for example, cable TV (CATV) system and the like, and more particularly to a communication line connecting apparatus restricts the band used in communication line to be connected to a cable modem and a method of controlling the communication line connecting apparatus.

2. Description of the Related Art

Recently, the CATV system provides not only TV broadcasting service using the CATV network but also data communication service using a personal computer and a portable information terminal having a wireless communication function.

For example, if user intends to acquire his desired information from an information provider on Internet, he calls to a desired information provider from a personal computer. Then, the personal computer and CATV cable modem are connected through a wireless local area network (LAN) and then, the computer accesses a server of the information provider from the cable modem through CATV network, CATV broadcasting station and Internet. If a communication path is established between the personal computer and the server, information depending on a demand of the personal computer is transmitted from the server to the personal computer through the communication path.

In the above-described CATV system, a frequency band for use in communication on the CATV network is allocated from the CATV broadcasting station in the unit of cable modem depending on communication traffic on the CATV network (for example, Jpn. Pat. Appln. KOKAI Publication No. 2002-152709). Thus, the usage frequency band of the CATV network can be used effectively.

Plural personal computers are connected to each cable modem through wireless LAN. If only a personal computer is connected and low-speed mode communication is carried out, a specific frequency band is allocated to a single personal computer, so that a large band is consumed unnecessarily, thereby disabling a connecting demand from other personal computers from being met easily.

For the reason, a system capable of changing the width of the usage frequency band arbitrarily depending on high-speed/low-speed communication mode has been proposed (for example, Jpn. Pat. Appln. KOKAI Publication No. 8-228173).

However, the above-described system has such a problem that because the width of the frequency band is changed by the personal computer, a processing load on the personal computer increases due to the configuration of the personal computer. Further, no band condition set up between the cable modem and CATV broadcasting station can be reflected on the wireless LAN.

BRIEF SUMMARY OF THE INVENTION

Accordingly, an object of the present invention is to provide a communication line connecting apparatus capable of restricting the band with a connected terminal unit and a method of controlling the communication line connecting apparatus.

According to an aspect of the present invention, there is provided a communication line connecting apparatus adapted to connect an internal communication network being connected a terminal device, and an external communication network, comprising: an acquiring circuit to acquire a definition file which specifies a band for use in the internal communication network for the terminal device; and a controller which allocates the band to the requesting terminal device based on the definition file, when a connection request occurs in the terminal device.

According to another aspect of the present invention, there is provided a control method for use in a communication line connecting apparatus adapted to connect an internal communication network being connected a terminal device, and an external communication network, comprising: acquiring a definition file which specifies a band for use in the internal communication network for the terminal device; and allocating the band to the requesting terminal device based on the definition file, when a connection request occurs in the terminal device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the specific configuration of a cable modem as a communication line connecting apparatus of the present invention according to the first embodiment;

FIG. 4 is a schematic configuration diagram showing an example in which plural personal computers are connected to a cable modem according to the second embodiment of the present invention.

DETAILED DESCRIPTION OF THE INVENTION

Hereinafter, the preferred embodiments of the present invention will be described in detail with reference to the accompanying drawings.

First Embodiment

Figure 1:
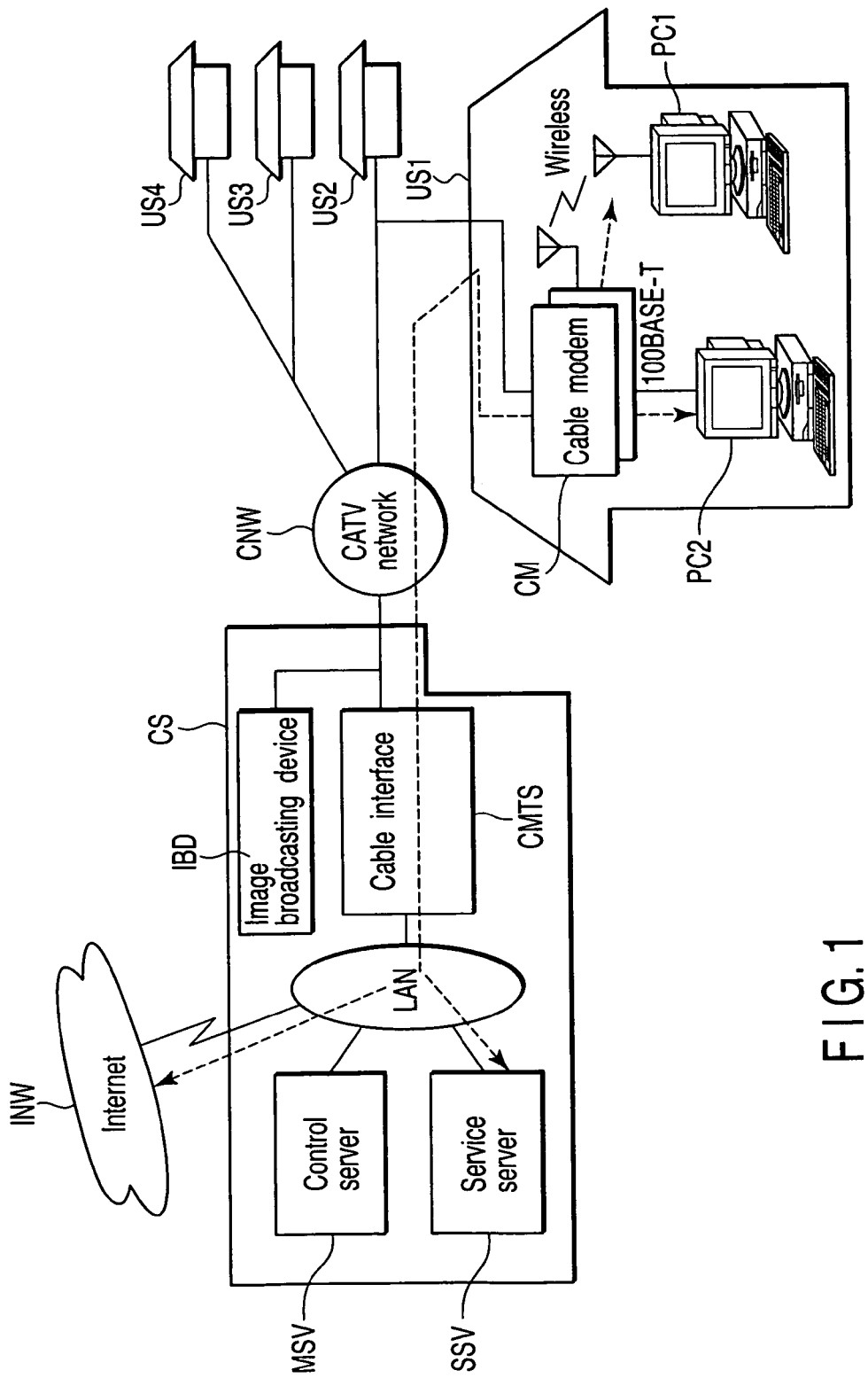
FIG. 1 is a schematic configuration diagram of CATV system using the communication line connecting apparatus according to the first embodiment of the present invention.

FIG. 1 is a schematic configuration diagram of the CATV system using the communication line connecting apparatus according to the first embodiment of the present invention. In FIG. 1, reference symbols US1 to US4 designate user system and CS designates cable TV station. Here, the user system US1 will be described below.

The user system US1 comprises cable modem CM and personal computers PC1, PC2. The cable modem CM is connected to a subscriber's line of CATV network CNW. When a call or a connection instruction is received from the personal computers PC1, PC2, the personal computers PC1, PC2 are connected to the cable TV station CS through the CATV network CNW, bi-directional communication with the cable TV station CS is enabled. In the meanwhile, a portable information terminal or portable phone having wireless communication function is permitted to be connected as well as the personal computers PC1, PC2.

The cable TV station CS is provided with image broadcasting device IBD, cable interface CMTS, control server MSV and service server SSV. Of them, the cable interface CMTS, control server MSV and service server SSV are connected to each other through LAN.

The control server MSV has a system control function which executes certification for connections of subscriber line terminal and personal computers PC1, PC2 to Internet INW, accounting and the like. The service server SSV has a function for downloading various kinds of information corresponding to demands of the subscriber's line terminal and personal computers PC1, PC2.

The image broadcasting device IBD transmits program information to respective user systems US1 to US4 through the CATV network CNW.

FIG. 2 is a block diagram showing the specific configuration of the above-described cable modem CM used as the communication line connecting device of the present invention.

The cable modem CM comprises a tuner 11, a modulator/demodulator 12, an RFMAC 13, a CPU 14, a memory 15, a wired LAN interface portion 16 (hereinafter referred to as LAN I/F16), wireless LAN interface portion 17 (hereinafter referred to as wireless LAN I/F17) and a flash memory 18. Of them, the RFMAC 13, the CPU 14, the memory 15, the LAN I/F 16, the wireless LAN I/F17 and the flash memory 18 are connected to each other through the data bus 19.

A communication signal sent out from the cable TV station CS passes a tuner 11, so that arbitrary communication data is extracted by demodulation of the modulator/demodulator 12 and communication data is demodulated by the RFMAC 13. In the meanwhile, the communication signal from the cable TV station CS undergoes quadrature phase shift keying (QPSK) modulation or quadrature amplitude modulation (QAM).

The personal computer PC2 is connected to the LAN I/F16 through the wired LAN. Then, the LAN I/F 16 transmits communication data received from the CATV network CNW to the personal computer PC2. The communication data inputted through the personal computer PC2 is transmitted to the cable TV station CS through the RFMAC 13, the modulator/demodulator 12, and the tuner 11.

The personal computer PC1 is connected to the wireless LAN I/F 17 through wireless LAN. Then, the wireless LAN I/F 17 transmits the communication data sent from the CATV network to the personal computer PC1. The communication data inputted through the personal computer PC1 is transmitted to the cable TV station CS through the RFMAC 13, the modulator/demodulator 12, and the tuner 11.

The CPU 14 controls respective components of the cable modem CM based on control data memorized in the memory 15. In the meantime, the memory 15 memorizes definition files for specifying the frequency band for use in the personal computers PC1, PC2. This definition file can be created by an owner of the cable modem CM or a band condition set up between the cable modem CM and the cable TV station CS can be reflected on this definition file. In the meantime, the definition file created by the owner is memorized in the flash memory 18.

The CPU 14 has a function for reading a definition file from the memory 15 and a function for when a connection request is dispatched from the personal computers PC1, PC2, determining the frequency band for use based on the definition file as the functions pertinent to the present invention.

Next, processing operation based on the above-described configuration will be described.

Figure 3:
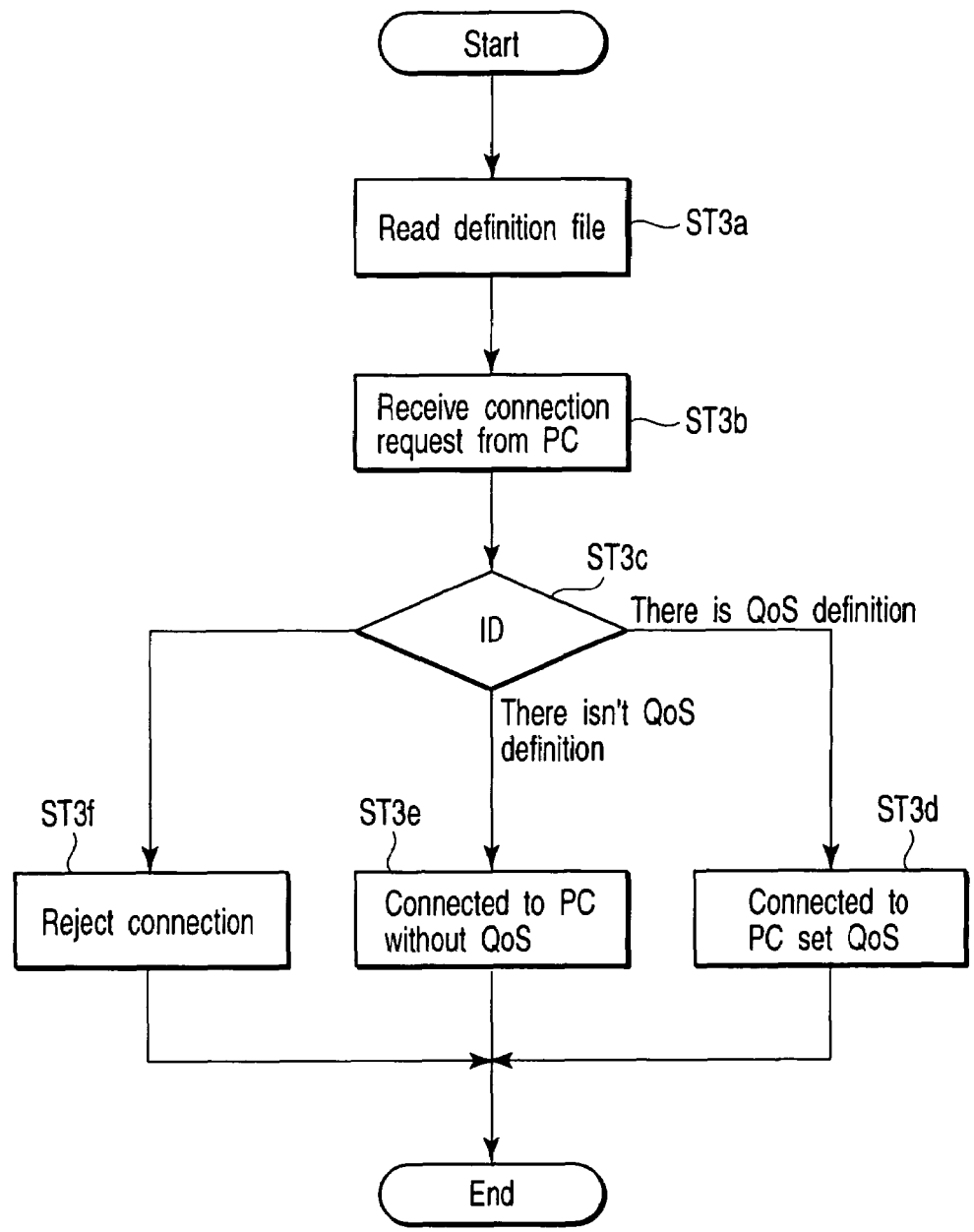
FIG. 3 is a flow chart for explaining the processing operation of the CPU in the cable modem according to the first embodiment.

FIG. 3 is a flow chart for explaining the processing operation of the CPU 14 in the above-described cable modem.

First, the CPU 14 reads a definition file memorized in the memory 15 (step ST3a). Then, if a connection request arrives from the personal computer PCl (step ST3b), the CPU 14 determines whether or not the media access control (MAC) address of the personal computer PC1 is registered in the definition file and whether or not the frequency band for use is specified (step ST3c). Meanwhile, the MAC address is a fixed network address which is allocated to the personal computers PC1, PC2. It is permissible to use SSID or the like as well as this MAC address.

If the frequency band for use on the wireless LAN is specified for the personal computer PC1, the CPU 14 controls the wireless LAN I/F 17 so as to set up the frequency band registered in the definition file in the relation with the personal computer PC1 (step ST3d).

On the other hand, if no frequency band for use on the wireless LAN is specified for the personal computer PC1, the CPU 14 connects the personal computer PC1 as it is (step ST3e).

Unless any MAC address of the personal computer PC1 is registered in the definition file, the CPU 14 rejects connection to the personal computer PC1 (step ST3f). In this case, the band which the personal computer PC1 uses is set to "0".

According to the first embodiment, a definition file describing the MAC address of the personal computer PC1 and the frequency band which the personal computer PC1 uses on the wireless LAN is registered, the CPU 14 reads the definition file memorized in the memory 15 and when a connection request is dispatched from the personal computer PC1, a frequency band which the personal computer PC1 should use is determined based on the definition file and this determined frequency band is set in the relation with the personal computer PC1.

Thus, by using the wireless LAN effectively, the personal computer PC1 and other terminal unit can be connected. Further, it is possible to meet a connection request from the personal computer PC2.

Because the frequency band is determined fixedly for each of the personal computers in the definition file, even if connection requests occurs from different computers in the same time period, these personal computers can be connected in parallel, so that connection control on plural personal computers including the personal computer PC1 can be executed effectively.

Further, according to the first embodiment, whether or not the personal computer PC1 which dispatched a connection request is registered in the definition file is determined by the CPU 14 when the connection request occurs and otherwise, the connection request is rejected. Thus, even if other user tries to connect a personal computer other than the registered personal computer PC1 intentionally, an illegal connection can be blocked.

Second Embodiment

FIG. 4 is a schematic configuration diagram showing an example in which plural personal computers PC1, PC3 are connected to the cable modem CM according to the second embodiment of the present invention. That is, the CPU 14 of the cable modem CM can change the usage frequency band of the personal computer PC1 being connected according to a preliminarily set condition.

Figure 5:
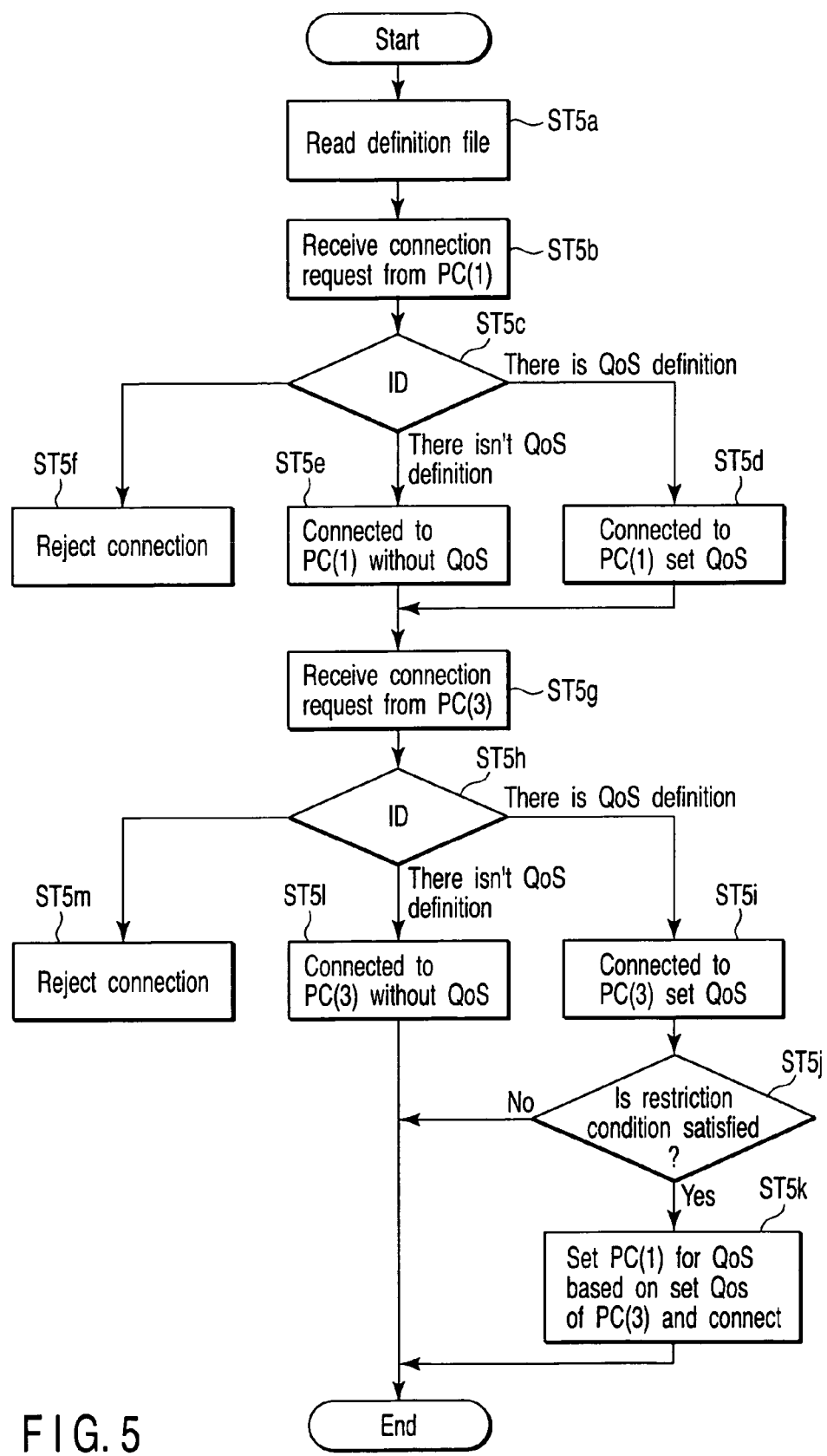
FIG. 5 is a flow chart for explaining the processing operation of the CPU in the cable modem according to the second embodiment.

FIG. 5 is a flow chart for explaining the processing operation of the CPU 14 according to the second embodiment of the present invention.

First, the CPU 14 reads a definition file memorized in the memory 15 (step ST5a). Then, if a connection request arrives from the personal computer PC1 (step ST5b), the CPU 14 determines whether or not the MAC address of the personal computer PC1 is registered in the definition file and whether or not a usage frequency band is determined (step ST5c). In the meantime, it is permissible to use SSID or the like as well as this MAC address.

If a frequency band for use in the wireless LAN is determined for the personal computer PC1, the CPU 14 controls the wireless LAN I/F 17 so as to set up a frequency band registered in the definition file for the personal computer PC1 (step ST5d).

On the other hand, unless any frequency band for use on the wireless LAN is determined for the personal computer PC1, the CPU 14 connects the personal computer PC1 as it is (step ST5e).

If the MAC address of the personal computer PC1 is not registered in the definition file, the CPU 14 rejects connection to the personal computer PC1 (step ST5f). In this case, the band which the personal computer PC2 uses is set to "0".

On the other hand, if the connection request arrives from the personal computer PC3 (step ST5g), the CPU 14 determines whether or not the MAC address of the personal computer PC3 included in this connection request is registered in the definition file and whether or not a usage frequency band is determined (step ST5h).

If a frequency band for use on the wireless LAN is determined for the personal computer PC3, the CPU 14 controls the wireless LAN I/F 17 so as to set up the frequency band registered in the definition file for the personal computer PC3 (step ST5i).

Subsequently, the CPU 14 determines whether or not the preliminarily set condition is satisfied (step ST5j). If the frequency band of the personal computer PC1 set up on the wireless LAN as a condition is narrower than the frequency band of the personal computer PC3, the CPU 14 sets up the frequency band of the personal computer PC1 so that it meets a frequency band setting (Qos setting) of the personal computer PC3 and reconnects (step ST5k).

On the other hand, unless any frequency band for use on the wireless LAN is determined for the personal computer PC3, the CPU 14 connects the personal computer PC3 as it is (step ST5l).

If the MAC address of the personal computer PC3 is not registered in the definition file, the CPU 14 rejects connection to the personal computer PC3 (step ST5m). In this case, the band for use by the personal computer PC3 is set to "0".

If a frequency band for use with the cable TV station CS is restricted to any particular range, the CPU 14 is capable of setting up a frequency band for use on the wireless LAN for the personal computers PC1, PC3 within this restricted frequency band.

As described above, the second embodiment refers to a condition in which the personal computer PC1 is connected through the wireless LAN and for example, if the personal computer PC3 sends a connection request, when the preliminarily set condition is satisfied, the usage frequency band of the personal computer PC1 is changed to the usage frequency band of the personal computer PC3.

Thus, if the frequency band allocated to the personal computer PC3 is wider than the frequency band allocated to the personal computer PC1, the personal computer PC1 is capable of using that wide frequency band. If the number of the personal computers connected is used as a condition, an optimum band can be set up depending on the quantity of the personal computers connected so that when a few people uses, the band width which each user uses is widened and when connection requests are busy, the band width which each user uses is narrowed.

According to the second embodiment, if the frequency band for use with the cable TV station CS is restricted, the frequency band for use on the wireless LAN is set up by the CPU 14 for the personal computers PC1, PC3 within this restricted frequency band.

Although the CATV network CNW cannot use nothing but narrow bands, this method prevents wireless LAN's using a wide band.

Other Embodiment

The present invention is not restricted to the above described embodiments. In each of the embodiments, examples in which the definition file memorized in the memory is used have been described. However, the present invention is not restricted to this example, but if a server is connected to the cable modem, it is permissible to store the definition file in the server and obtain the definition file from the server depending on necessity.

Although in each of the embodiments, examples in which the frequency band for use on the wireless LAN is allocated to each personal computer have been described, it is permissible to allocate the frequency band for use on wired LAN to each personal computer as well as the frequency band for use on the wireless LAN.

The configuration and type of the system, the configuration of the cable TV station and user system, the configuration of the cable modem, the content of the definition file, the allocation procedure of the frequency band and the like can be modified and executed within a scope not departing from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication line connecting apparatus adapted to connect an internal communication network being connected to a terminal device, and an external communication network, comprising:
    an acquiring circuit to acquire a definition file which specifies a quality of service (QOS) for use in the internal communication network for the terminal device; and
    a controller which allocates the QOS to the requesting terminal device based on the definition file, when a connection request occurs in the terminal device,
    wherein the controller allocates the QOS for use in the internal communication network to the terminal device within an external QOS, when the external QOS is set up in the external communication network.

2. The apparatus according to claim 1, wherein the controller changes the QOS set in the internal communication network according to a preliminarily set condition, when the terminal device has been connected.

3. The apparatus according to claim 2, wherein the controller uses the number of the connected terminal devices to determine the condition.

4. The apparatus according to claim 1, wherein the controller determines whether or not a terminal device requested to be connected is registered in the definition file, and rejects connection to the terminal device unless the terminal device is registered.

5. The apparatus according to claim 1, wherein the internal communication network includes wireless local area network.

6. A control method for use in a communication line connecting apparatus adapted to connect an internal communication network being connected to a terminal device, and an external communication network, comprising:
    acquiring a definition file which specifies a quality of service (QOS) for use in the internal communication network for the terminal device; and
    allocating the QOS to the requesting terminal device based on the definition file when a connection request occurs in the terminal device,
    wherein the allocating includes allocating the QOS for use in the internal communication network to the terminal device within an external QOS, when the external QOS is set up in the external communication network.

7. The method according to claim 6, wherein the allocating includes changing the QOS set in the internal communication network according to a preliminarily set condition, when the terminal device has been connected.

8. The method according to claim 7, wherein the allocating includes using the number of the connected terminal devices to determine the condition.

9. The method according to claim 6, wherein the allocating includes determining whether or not a terminal device requested to be connected is registered in the definition file, and rejecting connection to the terminal device unless the terminal device is registered.

10. The method according to claim 6, wherein the internal communication network includes wireless local area network.

* * * * *